United States Patent [19]

Cetinkaya et al.

[11] Patent Number: 5,343,939
[45] Date of Patent: Sep. 6, 1994

[54] OFFSET FCC COOLERS WITH IMPROVED CATALYST CIRCULATION

[75] Inventors: Ismail B. Cetinkaya, Palatine; David A. Lomas, Barrington, both of Ill.

[73] Assignee: UOP, Des Plaines, Ill.

[21] Appl. No.: 989,682

[22] Filed: Dec. 14, 1992

[51] Int. Cl.⁵ .............................. F28C 3/16; B01J 38/32
[52] U.S. Cl. .......................... 165/104.18; 165/104.16; 422/145; 422/146; 502/44
[58] Field of Search ............... 165/104.16, 104.18; 422/145, 146; 502/44

[56] References Cited

U.S. PATENT DOCUMENTS

| | | | |
|---|---|---|---|
| 4,438,071 | 3/1984 | Vickers et al. | 422/146 |
| 4,439,533 | 3/1984 | Lomas et al. | 502/6 |
| 4,698,212 | 10/1987 | Walters et al. | 422/145 |
| 4,958,680 | 9/1990 | Barnes et al. | 422/146 |
| 4,971,767 | 11/1990 | Ludwigsen et al. | 422/144 |

Primary Examiner—Albert W. Davis, Jr.
Attorney, Agent, or Firm—Thomas K. McBride; John G. Tolomei

[57] ABSTRACT

A method of heating or cooling particulate material by indirect heat exchange of the particles with the heat exchange fluid in a heat exchanger located outside and offset from the vessel that supplies the particulate material and to which the particulate material returns uses the addition of an open conduit to increase catalyst circulation through the heat exchanger. The open conduit has been found to be effective when used internally or externally. The internal use of the open conduit minimizes structural changes required to retrofit the conduit to existing back mix coolers. The use of the conduit for increased catalyst circulation allows a flow through type cooler duty to be produced in an amount of space that would ordinarily only permit the use of a backmix type cooler.

3 Claims, 3 Drawing Sheets

OFFSET FCC COOLERS WITH IMPROVED CATALYST CIRCULATION

FIELD OF THE INVENTION

This invention relates to methods and heat exchangers for heating or cooling particulate material. More particularly, this invention relates to methods for heating or cooling hot particles by indirect heat exchange and heat exchangers for use therein.

BACKGROUND OF THE INVENTION

Heat exchangers for heating or cooling particulate, comminuted or fine grade material by indirect contact with a heating or cooling fluid are well known. Heat exchangers of this type maintain the particulate material in a fluidized state with fluidizing medium that passes upwardly through a bed of the material. A series of conduits comprising tubes, channels or coils are positioned within the fluidized bed. A fluid passes through the conduits to add or remove heat from the fluidized solids by indirect heat exchange. Fluidized solids are continuously supplied to the fluidized bed and fluidized solids are continuously withdrawn from the bed. Methods of supplying or withdrawing solids from the bed through the exchanger include flow through and backmix type exchangers. There are two basic versions of flow through coolers; one uses gravity feed wherein particulates enter an upper inlet and exit a lower outlet, and the other employs fluidized transport that moves particles from a lower inlet past the cooling conduits and out an upper outlet. In a backmix operation particles are circulated through a common inlet and outlet that exchanges particles with the rest of the process.

Heat exchangers for the indirect heating or cooling of particulate material have found widespread application in a number of industrial processes. These processes include treatment of mineral matter, the handling of metallurgical ores, the manufacture of petrochemicals and the conversion of hydrocarbons. A number of exchanger configurations have evolved to suit the needs of these different processes. Indirect heat exchangers of the above-described type have been finding increasing use as particle coolers on the regenerators of processes for the fluidized catalytic conversion of hydrocarbons.

The Fluidized Catalytic Cracking (FCC) process has been extensively relied upon for the conversion of hydrocarbon streams such as vacuum gas oils and other relatively heavy oils into lighter and more valuable products. In the FCC process, starting hydrocarbon material contacts a finely divided particulate catalyst which is fluidized by a gas or vapor. As the particulate material catalyzes the cracking reaction, a by-product of the cracking reaction referred to as coke is surface-deposited thereon. A regenerator, which is an integral part of the FCC process, continuously removes coke from the catalyst surface by oxidation. Oxidation of the coke releases a large amount of heat which in part supplies the heat input needed for the cracking reaction. As FCC units have been called upon to process heavier feeds, greater amounts of coke must be removed in the regeneration zone with a corresponding increase in the amount of heat generated therein. This additional heat poses a number of problems for the FCC process. The excess heat can upset the thermal balance of the process thereby requiring a lowering of the circulation of hot catalyst from the regenerator to the reactor which in turn can lower the yield of valuable products. In addition, the excess heat may raise temperatures to the point of damaging the equipment or catalyst particles. Therefore, it is advantageous to have a means of lowering the regenerator temperature. For reasons of temperature control and process flexibility, heat exchangers having cooling tubes located outside the regenerator vessel have become the method of choice.

An important consideration in the FCC process as well as other processes that involve the handling of particulate material is the transport of the particulate material. It is often difficult to incorporate a heat exchanger having the necessary dimensions to provide the desired degree of particulate heat transfer into the constraints of the process arrangement. In the main, these constraints involve obtaining sufficient exchanger length to accommodate the required surface area of the exchanger conduits and providing inlets and outlets for the movement of the particles between the exchanger and the rest of the process unit. In the case of an FCC process unit, addition of a particle heat exchanger may necessitate raising the entire structure, or the incorporation of extra conduits and fluidization devices in order to meet the exchanger design requirements. When the particle heat exchanger is added to a newly designed FCC unit, the increased elevation and/or added conduits and fluidization devices raise costs and complicate construction of the unit. It is also popular to retrofit particulate heat exchangers into existing FCC process units. In these cases, the structural constraints may not only add to the cost of the unit, but may not permit the incorporation of a particulate exchanger having the desired heat removal capacity.

The use of a backmix type exchanger, as previously mentioned, will simplify the incorporation of the particle heat exchanger into any process since it only requires the use of a single inlet/outlet conduit. However, the overall heat exchange capacity of this type of device is limited by the amount of catalyst circulation that can be obtained over its vertical length. Moreover, the overall heat transfer per length of cooling conduit available in the backmix cooler is lower than in the flow through type exchanger where catalyst flows from an inlet in one end of the heater exchanger to an outlet at the opposite end. Finally, an additional layout constraint of the backmix type cooler is its need for a very large inlet/outlet conduit in order to obtain adequate particle circulation between the heat exchanger and the region where the particles are withdrawn and retrieved referred to herein as a retention zone. Even where a large outlet is provided, it still may not provide enough recirculation or exchange between the heat exchanger and the vessel providing the particulate material. Therefore, the backmix type exchanger cannot overcome many of the layout problems associated with the incorporation of a remote particle heat exchanger into a process that requires heating or cooling of particulate material.

SUMMARY OF THE INVENTION

This invention is a method of heating or cooling particulate material by indirect heat exchange of the particles with a heat exchange fluid in a heat exchanger that is located outside and offset from the vessel that supplies the particulate material and to which the particulate material returns. By using an additional open flow conduit it has been discovered that the simple design of a backmix heat exchanger can be made to operate with the same efficiency of a flow through type heat exchanger. The open flow conduit circulates particles through the exchanger in flow through fashion. Since the conduit has no valves or other flow control devices it requires minimal length and diameter. Therefore, the arrangement of this invention allows a backmix heat exchanger that function as a flow through device to fit in layout that would normally only provide enough room for a backmix type heat exchanger.

It is an object of this invention to provide a method of cooling particles and a particle heat exchanger having improved heat transfer capacity.

Another object of this invention is to provide a particle heat exchanger that is easily adapted to the configuration of the equipment supplying the particles.

A yet further object of this invention is to provide a method of easily improving the heat transfer capacity on existing backmix type coolers.

Accordingly, in one embodiment, this invention is a method for heating or cooling particles. The method comprises collecting particles in a catalyst bed and transferring the particles to a heat exchange zone through a particle transfer passageway that extends at least in part in a horizontal direction. Indirect heat exchange with a cooling fluid cools the particles in the heat exchange zone and the addition of a fluidizing gas into a lower portion of heat exchange zone fluidizes the catalyst particles. An open conduit communicates with the bed and the cooler to transport catalyst to or from a lower portion of heat exchange zone. The term open conduit denotes a conduit that does not contain flow control devices that could be used to interrupt the flow of catalyst through the conduit.

In another embodiment, this invention is a process for regenerating catalyst particles containing coke, the process includes contacting catalyst particles and a regeneration gas in a regeneration zone at regeneration conditions to combust coke from the catalyst particles, and form a bed of catalyst particles having a first density through which the regeneration gas passes in the regeneration zone; transporting catalyst between the bed and a catalyst cooler via a passageway that extends at least in part in a horizontal direction; contacting the catalyst in the catalyst cooler by indirect heat transfer with a cooling fluid; passing a fluidizing gas into a lower portion of the catalyst cooler to establish a second catalyst density in the catalyst cooler; and, transporting catalyst particles between the catalyst cooler and the bed through a conduit at a third catalyst density that differs from the second catalyst density. In this embodiment the conduit operates to provide a flow path between the catalyst cooler and the bed that is not interrupted by any structure or mechanical device.

In another embodiment this invention comprises an apparatus for regenerating fluidized particles comprising a regeneration vessel for contacting coke contaminated particles with a regeneration gas; a vertically disposed cooling vessel containing a plurality of heat exchange tubes; a horizontally extending passageway providing open communication between the catalyst regeneration vessel and the cooling vessel; a conduit having a bottom opening located in a lower portion of the cooling vessel, a top opening in the regeneration vessel, and an uninterruptable flow path between the top and bottom opening; and, means for adding fluidizing gas to a lower portion of the cooling vessel and varying the amount of the fluidizing gas that enters the conduit with respect to the remainder of the cooling vessel.

The method and apparatus of this invention have been found to be particularly beneficial for backmix type coolers. This invention eliminates the need for a large opening to promote reflux catalyst circulation about the top of the cooler. This simple method of converting a catalyst cooler to a flow through operation allows catalyst circulation to take place through much smaller openings than are usually required for an ordinary back-mix type cooler. This increased exchange of hot catalyst maintains a high average heat transfer condition in the cooler by the constant circulation of a large volume of hot catalyst. Therefore this invention improves the typical backmix arrangement having an inlet at the top of the cooler.

The practice of this invention requires little additional equipment. Modifications for implementation of this invention require only the addition of relatively small conduit for catalyst transfer and possibly some modification of the fluidizing gas distributor in the cooler. The conduit for catalyst transfer contains no valves or other flow restriction devices and is relatively inexpensive to provide.

In those cases where the conduit is located on the inside of the cooler vessel, retrofitting of the invention onto an existing catalyst cooler will not even require changes to the pressure vessel shell of either the regenerator or cooler vessels. The conduit may be simply secured to the inside of the vessel. Other required modifications are limited to the possible removal of some heat exchange tubes to make room for the conduit and the plugging or capping of some portion of the fluidization gas distributor.

Other embodiments, details and arrangements of the present invention are described in the following detailed description.

DETAILED DESCRIPTION OF THE INVENTION

The present invention, in its process aspects, consists of steps for the heating or cooling of a fluidized particulate solid. The method and apparatus of this invention can be used for either the heating or cooling of particles, however, for the sake of simplicity, the description will only make reference to particle cooling. An important application of the invention will be in a process for the combustion of a combustible material from fluidized solid particles containing the combustible material, including the step of introducing oxygen containing combustion gas and the fluidized solid particles into a combustion zone maintained at a temperature sufficient for oxidation of the combustible material. The combustible material will be oxidized therein to produce a dense phase fluidized bed of hot fluidized solid particles cooled by the process of this invention.

The above combustion zone may be in dilute phase with the hot particles transported to a disengaging zone wherein the hot particles are collected and maintained as the first mentioned bed, or the combustion zone may be in dense phase and in itself comprise the first bed. The term "dilute phase", as used herein, shall mean a mixture of catalyst particles and gas having a density of less than 30 lbs/ft$^3$, and "dense phase" shall mean such mixture equal to or more than 30 lbs/ft$^3$.

In a particularly important embodiment of the invention, there will be included steps for the regenerative combustion within a regeneration zone of a coke containing FCC catalyst from a reaction zone to form hot flue gas and hot regenerated catalyst, disengagement and collection of the hot regenerated catalyst, cooling of the hot regenerated catalyst in a heat removal or, as more often referred to, cooling zone comprising the heat exchanger of this invention and the return of the cooled regenerated catalyst to the regeneration or reaction zone for control of the temperatures of the catalyst in the regeneration zone. For the purposes of an FCC process, the term "hot regenerated catalyst" means regenerated catalyst at the temperature leaving the combustion zone, from about 1300 to about 1400 $\phi$ F., while the term "cool regenerated catalyst" means regenerated catalyst at the temperature leaving the cooling zone, the latter of which is up to 200 $\phi$ F. less than the temperature of the hot regenerated catalyst.

Figure 1:
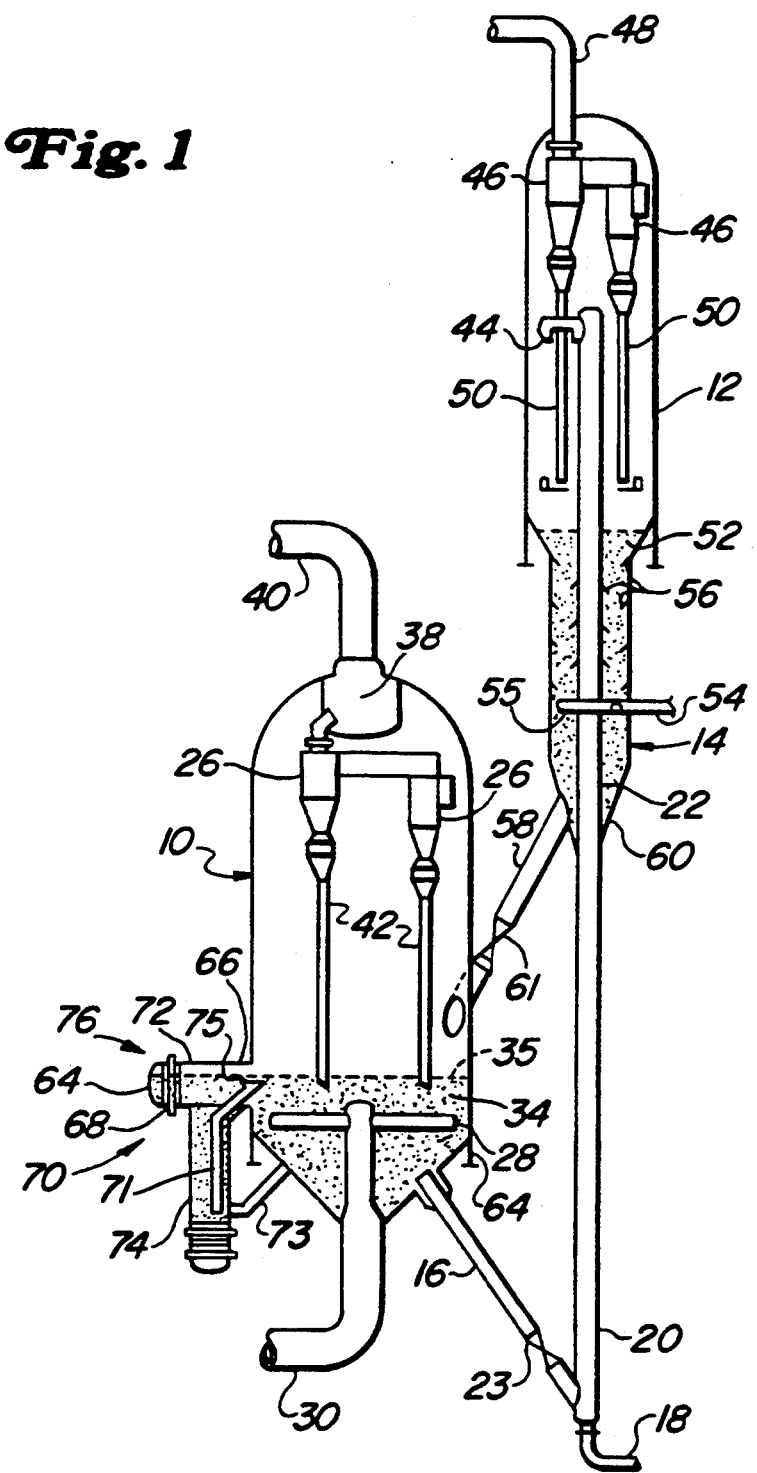
FIG. 1 is an elevation view of an FCC reactor-regenerator having a particle exchanger of this invention.

Reference will now be made to FIG. 1 for a discussion of the particle heat exchanger and the method of invention. FIG. 1 depicts the arrangement of this invention applied to backmix type cooler that depends from a large access manway and which is more fully disclosed in U.S. Pat. No. 4,971,767, the contents of which are hereby incorporated by reference. Additional details on the operation of a backmix cooling zone can be found in U.S. Pat. No. 4,439,533, the contents of which are hereby incorporated by reference.

Looking then at FIG. 1, the FCC arrangement has a regeneration vessel 10, a reactor 12, located to the side and above the regenerator, and a stripping vessel 14 located directly below the reactor. A regenerated catalyst conduit 16 transfers catalyst from the regenerator through a control valve 23 and into a riser conduit 20 where it contacts hydrocarbon feed entering the riser through hydrocarbon feed conduit 18. Conduit 18 may also contain a fluidizing medium such as steam which is added with the feed. Expanding gases from the feed and fluidizing medium convey catalyst up the riser and into internal riser conduit 22. As the catalyst and feed pass up to the riser, the hydrocarbon feed cracks to lower boiling hydrocarbon products.

Riser 22 discharges the catalyst and hydrocarbon mixture through opening 44 to effect an initial separation of catalyst and hydrocarbon vapors. Outside openings 44, a majority of the hydrocarbon vapors continue to move upwardly into the inlet of cyclone separators 46 which effects a near complete removal of catalyst from the hydrocarbon vapors. Separated hydrocarbon vapors exit reactor 12 through an overhead conduit 48 while a dip leg conduit 50 returns separated catalyst to a lower portion of the reactor vessel. Catalyst from riser outlets 44 and dip leg conduit 50 collects in a lower portion of the reactor forming a bed of catalyst 52. Bed 52 supplies catalyst to stripping vessel 14. Steam entering stripping vessel 14 through a conduit 54 is distributed by a ring 55 and rises countercurrent to a downward flow of catalyst through the stripping vessel thereby removing sorbed hydrocarbons from the catalyst which are ultimately recovered with the steam by cyclone separators 46. In order to facilitate hydrocarbon removal, a series of downwardly sloping baffles 56 are provided in the stripping vessel 14. A spent catalyst conduit 58 removes catalyst from a lower conical section 60 of stripping vessel 14. A control valve 61 regulates the flow of catalyst from conduit 58.

Regeneration gas, such as compressed air, enters regenerator 10 through a conduit 30. An air distributor 28 disperses air over the cross-section of regenerator 10 where it contacts spent catalyst in bed 34 having an upper bed level 35. Coke is removed from the catalyst by combustion with oxygen entering from distributor 28. Combustion by-products and unreacted air components rise upwardly along with entrained catalyst through the regenerator into the inlets of cyclones 26. Relatively catalyst-free gas collects in an internal chamber 38 which communicates with a gas conduit 40 for removing spent regeneration gas from the regenerator. Catalyst, separated by the cyclones drops from the separators through dip leg conduits 42 and returns to bed 34.

Regeneration vessel 10 will typically have a refractory lined metal shell 24 which is capable of withstanding temperatures within the regenerator in excess of 1500° F. This makes the regenerator vessel suitable for high operating temperatures. An accessway 76 is positioned at a lower section of shell 24. Looking at accessway 76 from the outside of the regenerator vessel, it is positioned a short distance above a support skirt 64 from which the regenerator is supported by a suitable structure. Looking at accessway 76 from the interior of the regenerator, it is positioned a short distance above distributor 28 and with at least a portion of its vertical dimension below the top of catalyst bed surface 35. Accessway 76 serves as both a manway for the movement of maintenance personnel in out of the regeneration vessel when the interior of the vessel, such as the refractory lining, or the equipment located therein needs servicing. Accessway 76 usually has a large diameter so that equipment such as cyclones 26 may be brought in and out of the vessel through the accessway. Accessway 76 consists of an end cover 64 connected to a vessel nozzle 66 by a horizontal passageway extension 72 and a pair of flanges 68. Flanges 68 are of the usual bolted construction that allows the end cover 64 to be removed and reinstalled as necessary. Interior portions of the end cover, flanges and nozzle associated with accessway 76 are also internally refractory lined to withstand the high regenerator temperatures. A catalyst cooler 70 extends downwardly from the nozzle extension 72 that extends from nozzle 66. Catalyst cooler 70 includes a shell section 74 that extends in a substantially vertical direction from nozzle extension 72. A conduit 75 communicates the top of extension 72 with regeneration 10 at a location above bed 34.

In accordance with this invention FIG. 1 also shows two alternate locations for the open conduits of this invention. An internal conduit 71 having portions located in the regenerator vessel and the cooler vessel transfers catalyst from bed 34 to the bottom of the cooler. An external conduit, which can be used as an alternate or an addition to internal conduit 71, transfers catalyst from below the distributor 28 to the bottom of cooler 70.

Figure 2:
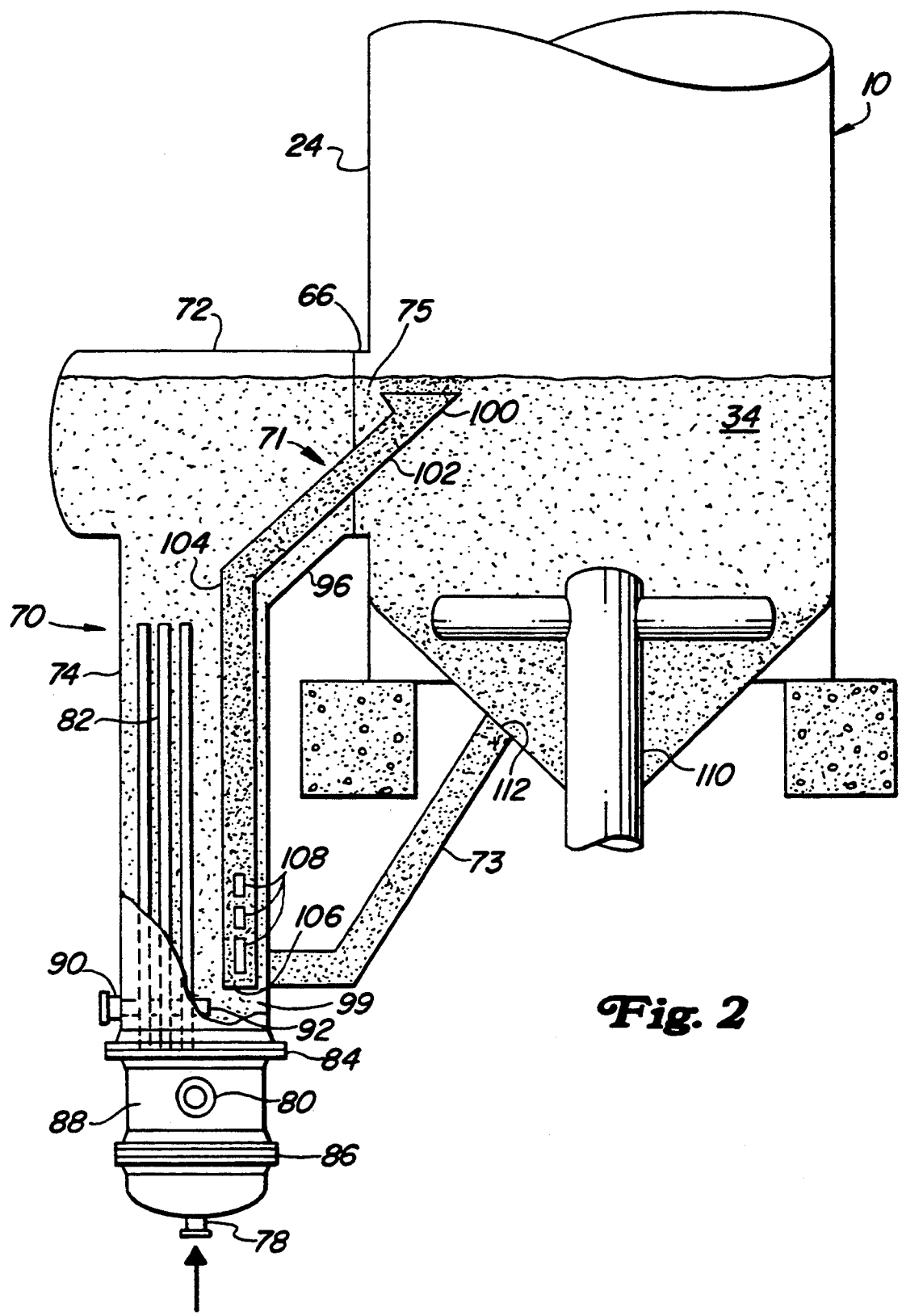
FIG. 2 shows an enlarged section view of one embodiment of the exchanger of this invention.

Additional details of the catalyst cooler arrangement and installation of FIG. 1 are shown in FIG. 2. The cooler shown in FIG. 2 is a backmix type cooler. Tube section 74 of the cooler houses a heat exchanger having catalyst on its shell side and a heat exchange medium, circulated by lines 78 and 80, on the tube side of a tube bundle 82. The tube bundle 82 shown in the exchanger of FIG. 2 is a bayonet type in which all of the tubes are attached to a single tube sheet located at the bottom of the heat exchanger. A typical configuration of tubes in the bayonet-type bundle would be one inch tubes each ascending from an inlet manifold in the head of the exchanger up into the shell through a three inch tube sealed at its top. Each one inch tube empties into the three inch tube in which it is contained just below the sealed end of the three inch tube. A liquid, such as water, would be passed up into the one inch tubes, would empty into the three inch tubes, would absorb heat from the hot catalyst through the wall of the three inch tubes as it passed downward through the annular space of the three inch tubes and would exit the heat exchanger, at least partially vaporized, from the outlet manifold. The preferred heat exchange medium would be water which, in further preference, would change only partially from liquid to gas phase when passing through the tubes. It is also preferable to operate the heat exchanger so that the exchange medium is circulated through the tubes at a constant rate. In the bayonette type tube design the sealed outer tube 82 has an unattached top end and a bottom end fixed to a tube sheet 84. The outer tube covers the internal tube that extends from just below the top of the bayonette tube to a lower tube sheet 86. Again the heat exchange fluid travels up the internal tubes and downwardly between the inner tube and the outer tube where it is collected in a chamber 88 located between upper tube sheet 84 and lower tube sheet 86. Fluidizing gas, preferably air, enters an aeration inlet 90 and is distributed between the tubes by distributor 92.

The lower portion of tube section 74 is cylindrical in shape. However, where the tube section attaches to the lower side of the nozzle extension 72, the cooler is enlarged so that its width in a direction parallel to principal direction of the nozzle is larger than the diameter of the cylindrical portion. The upper portion of the tube section is enlarged in this way to minimize the horizontal distance across the nozzle so that circulation of catalyst between the regenerator and the cooler is enhanced.

FIG. 2 also depicts two conduit arrangements for circulating catalysts through the cooler 70. One of these arrangements uses the internal conduit 71 to transfer catalyst from the top of bed 34 to the bottom of the cooler at a location 99. In operation, catalyst flows from a relatively dense space of bed 34 having a density in a range of from 30 to 40 lbs/ft$^3$. Hopper 100 provides an upper opening for conduit 71 and receives catalyst from the top of the bed. The lack of fluidization immediately above hopper raises the density of the catalyst passing through internal conduit 71. The higher density of the catalyst in the conduit relative to the catalyst density in the cooler causes the catalyst to flow downwardly first through an angled portion 102 of internal conduit 71 and then through a straight portion 104. Catalyst drops from conduit 71 through opening 106 where contact with fluidizing gas from distributor 90 decreases the density of the catalyst in the cooler to the previously specified range. Thus catalyst continuously flows down conduit 71 and up the cylindrical portion 74 of cooler 70. A certain amount of fluidizing gas from distributor 90 usually enters opening 106 to maintain fluid flow through conduit 71. In order to provide more direct control of catalyst circulation through conduit 71 a separate inlet for fluidizing gas directly beneath opening 106 may be provided. The addition of fluidizing gas into conduit 71 and the discharge of catalyst out of the conduit are promoted by a series of slots 108 located above opening 106. Angled section 102 serves to offset the catalyst withdrawal point for conduit 71 from the inside of cooler 70 and thereby collects catalyst having a higher average temperature than that collected immediately adjacent to a cooler opening 75. Conduit 71 occupies a relatively small space within the cooler and typically requires the removal of only from 10 to 20 bayonet tubes.

External conduit 73 provides a alternate means of providing a simple circulation of dense phase catalyst to the bottom of cooler 74 which does not require the removal of any heat exchange tubes. Conduit 73 removes catalyst from a region 110 located below air distributor 28 wherein the lack of fluidization gas raises the density of the catalyst. Catalyst below the air distributor will typically have a density of 45 lbs/ft$^3$ or higher. Whereas the density of catalyst above the air distributor is typically in a range of from 30 to 40 lbs/ft$^3$. The additional height from the opening 112 of conduit 73 to the top of the air distributor 28 raises the available catalyst head for driving catalyst through the cooler 74. Therefore, the higher density catalyst below the air grid and throughout external conduit 73 provides adequate pressure head to circulate catalyst to the bottom of the cooler and to allow the fluidizing gas to transport catalyst upwardly through vertical cooling section 74.

Figure 3:
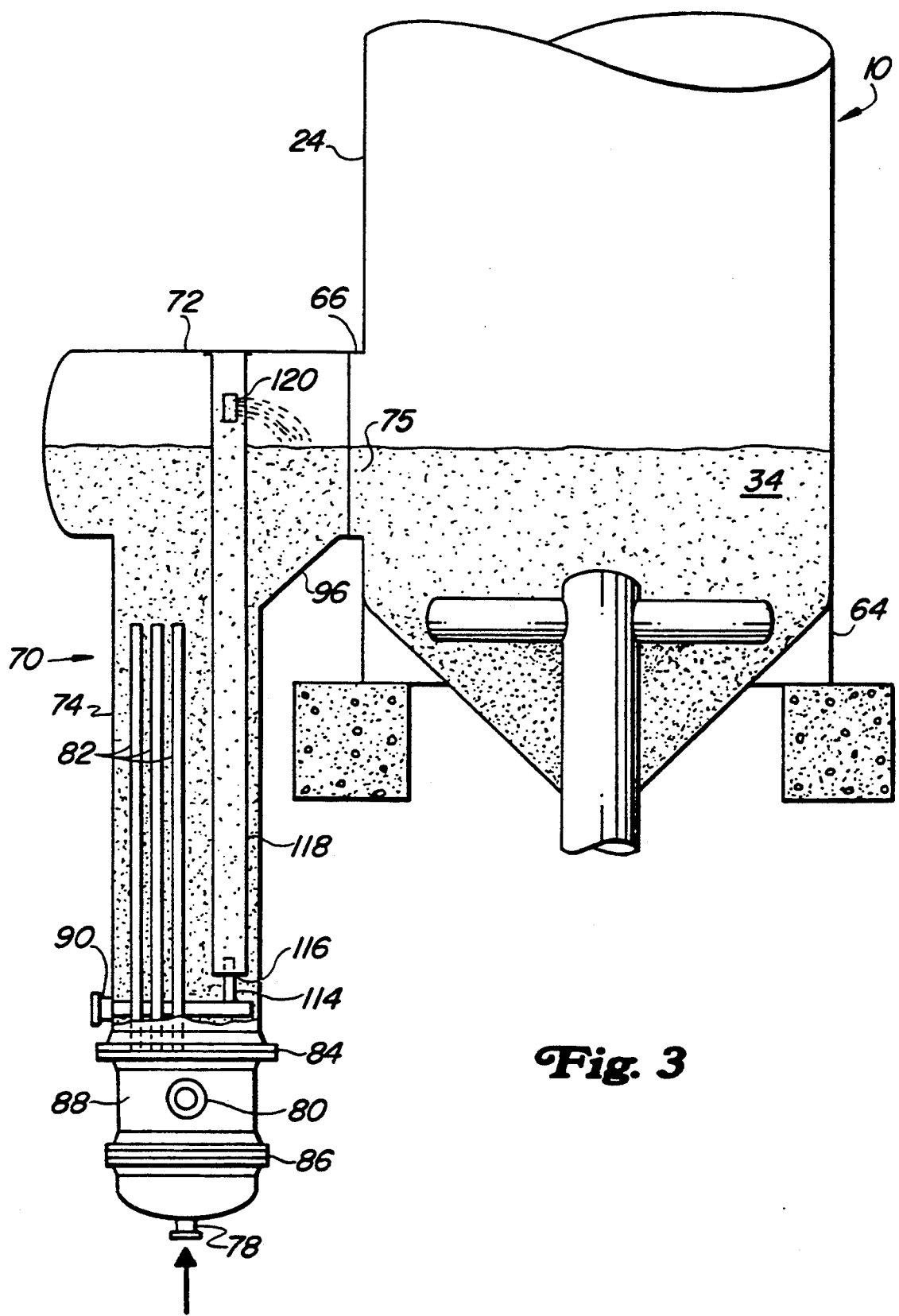
FIG. 3 shows an enlarged section view of the another embodiment of the exchanger of this invention.

In both of the conduit configurations depicted by FIG. 2 catalyst flows downwardly through the conduit supplying catalyst from the regeneration vessel. FIG. 3 depicts an alternate conduit arrangement wherein catalyst passes upwardly through an internal conduit and downwardly from catalyst opening 75 into the bottom of the cooler. In this embodiment the distal end of fluidizing gas distributor 90 has a nozzle 114 that directs a concentrated stream of fluidizing gas directly into an opening 116 of a vertical conduit 118. In contrast to internal conduit 71 where a lesser amount of fluidizing gas enters opening 106, nozzle 114 provides an excess of fluidizing gas relative to the rest of the cross-sectional area of catalyst cooler 74. The high addition of fluidizing gas lowers the density of the catalyst particles at opening 116 and transports catalyst at a lower density upwardly through conduit 118. The density of the catalyst in conduit 118 is typically in a range of from 10 to 35 lbs/ft$^3$. Once catalyst reaches the top of conduit 118 an opening 120 discharges catalyst to the top of bed 34. Discharge openings 120 are preferably slotted and oriented towards opening 75 to increase the circulation of relatively cool catalyst out of cooler 70. The open conduit of the type shown in FIG. 3 has the advantage of simple installation in an existing catalyst cooler. The conduit can be attached directly to the top of the back mix cooler.

What is claimed is:
1. An apparatus for regenerating fluidized particles comprising:
   a) a regeneration vessel for contacting coke contaminated particles with a regeneration gas;
   b) a vertically disposed cooling vessel containing a plurality of heat exchange tubes;
   c) a horizontally extending passageway providing open communication between said catalyst regeneration vessel and said cooling vessel;

d) a conduit that extends through said cooler and into said passage-way having a bottom opening located in a lower portion of said cooling vessel, a top opening in communication with said regeneration vessel, and a structurally uninterruptible flow path between said top and bottom opening; and, e) means for adding fluidizing gas to a lower portion of said cooling vessel and varying the amount of said fluidizing gas that enters said conduit with respect to the remainder of said cooling vessel.

2. The apparatus of claim 1 wherein a portion of said passageway extends in a principally horizontal direction from said regenerator and has a removable end closure at its distal end.

3. The apparatus of claim 1 wherein said conduit extends into said regeneration vessel.

* * * * *